Patented June 8, 1954

2,680,757

UNITED STATES PATENT OFFICE 2,680,757

CATALYST RECOVERY PROCESS

Chester M. Himel, Menlo Park, Calif., assignor to Richfield Oil Corporation, Los Angeles, Calif., a corporation of Delaware No Drawing. Application July 1, 1952,
Serial No. 296,717

5 Claims. (Cl. 260—439)

My invention relates to a process for the recovery of catalyst from a reaction mixture containing toluic acids and produced by the liquid phase, air oxidation of xylenes using as a catalyst a cobalt, manganese or cerium salt which is soluble in the reaction mixture.

Toluic acids can be prepared by the oxidation of xylenes with air or other oxygen-rich gas. One commercial source of xylenes is to be found in petroleum oil. Thus, petroleum naphtha which is rich in dimethyl cyclohexanes is dehydrogenated in the presence of hydrogen in accordance with the hydroforming or platforming processes to yield fractions containing xylenes and other compounds, depending upon the purity of the naphtha fraction processed with respect to content of dimethyl cyclohexanes.

My copending application, Serial No. 126,240 and the application of Lawrence M. Richards, Serial No. 126,327, both filed November 8, 1949, relate to the production of phthalic acids by the mild oxidation of xylenes to produce toluic acids and a further, more vigorous oxidation of toluic acids to produce phthalic acids, utilizing petroleum xylene fractions as starting materials. In these applications, a petroleum xylene fraction is first subjected to direct, liquid phase oxidation with air in the presence of a cobalt, manganese or cerium compound which is soluble in the reaction mixture, such as a cobalt soap, particularly the toluate soap. Reaction temperatures of from about 130° C. to about 190° C. are useful. The air oxidation is carried to partial completion, that is, from about 5 per cent to about 30 per cent by weight of oxygen is absorbed, based on the aromatic content of the petroleum xylene fraction. Such mild partial oxidation, while yielding a lower conversion of the petroleum xylene fraction, favors the production of toluic acids from the xylenes and acetophenone from any ethyl benzene present.

The liquid phase, air oxidation of xylenes to produce toluic acids is dependent upon the maintenance of an adequate concentration of catalyst as a salt dissolved in the reaction mixture. When the oxidation is complete, the economics of the process are particularly dependent upon a simple and effective method for separating the catalyst from the reaction mixture, preferably in a form in which the catalyst can be recycled for further use in the oxidation process. In accordance with my invention, I have discovered a simple and effective method for the removal of the catalyst from the reaction mixture by means of which the cobalt concentration of the reaction mixture can be reduced from the range of about 0.25 per cent to less than 0.003 per cent, for example. I do this by maintaining the reaction mixture at a temperature generally of from about 120° C. to about 200° C. (preferably about 130° C. to about 160° C.) while saturated with water and in contact with a substantially oxygen-free gas for a period of time which is sufficient to effect a precipitation of the catalyst from the reaction mixture, so that the catalyst can be recovered simply by conventional means, such as filtration.

The reaction mixture resulting from the oxidation of xylenes to produce toluic acids contains unreacted charge stock, partial oxidation products, toluic and other organic acids, as well as catalyst in various states of oxidation and is saturated with water. The presence of cobaltic salts imparts a deep green color to the reaction mixture. I have found that conversion of the catalyst to the cobaltous state, hydrate formation and precipitation occur readily if the reaction mixture, upon completion of the oxidation reaction, is maintained at a temperature of from about 120° C. to about 200° C, under pressure by a gas which is substantially free from oxygen, the purpose of the gas being to prevent the removal of the water which is present in the reaction mixture upon completion of the reaction.

It is essential that water be present in carrying out my process, water being necessary both for the rapid reduction of the cobaltic salts and for the formation of the insoluble hydrated cobaltous salts which I recover for further use in the oxidation of the xylenes. The time required for the reduction of the catalyst and its precipitation from the reaction mixture depends upon the particular conditions chosen, generally varying from about one minute to fifteen minutes. The insoluble cobalt salt produced as a result of carrying out my process is readily separated from the reaction mixture and is an effective oxidation catalyst when recycled for further use. After the separation of the catalyst, the toluic acids in purified form can be recovered from the reaction mixture by following the teachings of my application, Serial No. 296,716, filed of even date herewith and entitled "Purification of Toluic Acids." That application involves the use of certain saturated, liquid hydrocarbons for effecting purification.

The following examples illustrate in detail the practice of my invention, but should not be treated by way of limitation.

Example I 1500 grams of a petroleum xylene fraction composed of 3.0 per cent of ortho-xylene, 60.5 per cent of metaxylene, 23.0 per cent of para-xylene and 14.0 per cent of ethylbenzene was charged to a stirred autoclave together with 23 grams of anhydrous cobaltous toluate catalyst. The autoclave was then pressured with air to 200 p. s. i. g. and heated to 160° C. Air was charged to the autoclave for one hour at a rate of 50 cubic feet per hour measured at room temperature and pressure. After the air flow had been stopped, the reaction mixture, which was saturated with water resulting from the oxidation reaction, was held at 160° C. for ten minutes with stirring in order to effect a removal of any free oxygen present in the autoclave by permitting it to react and subsequent conversion of the catalyst to an insoluble form. The autoclave was then cooled and discharged, giving 1616 grams of a red-brown effluent. The reaction mixture was then filtered in order to remove the catalyst. The analysis of the filtrate indicated less than 0.003 per cent by weight of cobalt and the catalyst recovered by filtration was suitable for re-use in a xylene oxidation process.

Example II

A mixture of 16,500 grams of the petroleum xylene fraction employed in Example I and 254 grams of anhydrous cobaltous toluate catalyst was charged to the top of a continuous oxidation tower at a rate of 0.69 gallon per hour, countercurrently to a stream of air flowing at a rate of 50 cubic feet per hour measured at atmospheric temperature and pressure. The oxidation effluent was discharged continuously from the bottom of the tower into a surge tank. The pressure in this system was maintained at 200 p. s. i. g. and the temperature in the oxidation zone was 153° C. Effluent gases were removed from the top of the tower and, after being passed through a condenser system, were discharged to the atmosphere through a back-pressure regulator. The surge tank was blanketed by the effluent gas stream (containing about one per cent of oxygen, with the remainder being largely nitrogen together with small amounts of carbon monoxide and carbon dioxide) at 200 p. s. i. g. in order to maintain an adequate water concentration in the oxidation product in this zone. The temperature of the surge tank was held at 130–140° C. and the product was discharged after an average residence time of ten minutes. The effluent from the surge tank containing converted insoluble catalyst was filtered to remove the catalyst, and the filtrate was subsequently processed to recover unreacted xylenes, neutral oxidation products and toluic acids.

Various modifications can be made in the specific procedures described in the examples to provide other embodiments which fall within the scope of my invention. In general, the amount of oxygen present in the substantially oxygen-free gas with which the petroleum xylene oxidation mixture is maintained in contact should not exceed about 2–4 per cent by volume, and the amount of water present in the petroleum xylene oxidation reaction mixture should be sufficient to maintain the reaction mixture at the point of saturation. Excessive amounts of liquid phase water should not be present in the reaction mixture, since they tend to dissolve the catalyst to an undue extent and render its recovery more difficult.

I claim:

1. A method for the recovery of catalyst from the reaction mixture produced by the liquid phase, air oxidation of xylenes using as a catalyst a salt soluble in the reaction mixture and selected from the group consisting of cobalt, manganese and cerium salts in order to produce toluic acids, the said method comprising maintaining said mixture at a temperature of from about 120° C. to about 200° C. while saturated with water and in contact with a substantially oxygen-free gas for a period of time sufficient to effect a precipitation of the catalyst from the reaction mixture.

2. A method for the recovery of cobalt catalyst from the reaction mixture produced by the liquid phase, air oxidation of xylenes using as a catalyst a cobalt salt soluble in the reaction mixture in order to produce toluic acids, the said method comprising maintaining said mixture at a temperature of from about 120° C. to about 200° C. while saturated with water and in contact with a substantially oxygen-free gas for a period of time sufficient to effect a precipitation of the catalyst from the reaction mixture.

3. A method as in claim 2 in which the reaction mixture is maintained within the temperature range of from about 120° C. to about 200° C. for from about one to about fifteen minutes.

4. A method for the recovery of cobalt catalyst from the reaction mixture produced by the liquid phase, air oxidation of xylenes using as a catalyst a cobalt salt soluble in the reaction mixture in order to produce toluic acids, the said method comprising maintaining said mixture at a temperature from about 130° C. to about 160° C. while saturated with water and in contact with a substantially oxygen-free gas for a period of time sufficient to effect a precipitation of the catalyst from the reaction mixture.

5. A method as in claim 2 in which the precipitated catalyst is separated from the reaction mixture by filtration.

References Cited in the file of this patent

UNITED STATES PATENTS

| Number | Name | Date |
|---|---|---|
| 2,547,178 | Spence | Apr. 3, 1951 |